Patented Apr. 7, 1925.

1,532,533

UNITED STATES PATENT OFFICE.

JAMES E. HARRIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

COLLOIDAL SUSPENSION.

No Drawing.   Application filed December 16, 1919. Serial No. 345,439.

*To all whom it may concern:*

Be it known that I, JAMES E. HARRIS, a citizen of the United States, residing at East Orange, in the county of Essex and State of New Jersey, have invented certain new and useful Improvements in Colloidal Suspensions, of which the following is a full, clear, concise, and exact description.

This invention relates to a colloidal suspension and has particular reference to one which is adapted for use as a coating composition for filaments used in electron discharge devices.

An object of the invention is to produce a coating for filaments which may be applied thereto in a very fine state of subdivision.

Another object is to provide in the coating composition some constituent which will effect, at a suitable time, the reduction of oxides of the core metal which may have been formed on the core prior to the application of the coating material thereto.

Another object is the provision of a coating for filaments which has an increased emissivity and a longer life than has hitherto been possible.

Another object is the provision of a coating which, during application, results in a more effective binding between the coating and the filament core, within a wide range of operating temperatures, whereby the coating does not become subject to the peeling action sometimes present in thermionically coated filaments.

In general the coating comprises a colloidal suspension in which salts of certain metals are held in suspension in a very fine state of subdivision.

The preferred form of the invention involves the operation of the method and the use of the materials hereinafter set forth. This example of the operation of this invention is, however, descriptive only of the one form it assumes, and is not to be interpreted as defining the limits of the scope of the invention which has more broadly been stated in the previous paragraph. As an example of the operation of my invention, 15 grams of gelatin are dissolved in 100 grams of water, the gelatin being heated slightly until it is dissolved. 15 grams of barium nitrate are added and stirred until dissolved, after which 10 grams of ammonium carbonate are added. When the ammonium carbonate is added, barium carbonate is formed and is held in suspension in a very fine state of subdivision by the gelatin which acts as a protective colloid. This suspension is then applied to the filamentary core in any suitable manner, but preferably in the manner set forth in U. S. Patent No. 1,209,324 to Nicolson and Hull patented December 19, 1916, "Electron emitting cathode and the process of manufacturing the same."

In place of barium nitrate other substances such as barium chloride or barium acetate or any soluble barium salt may be used.

Strontium carbonate is next prepared in a manner similar to the preparation of the barium carbonate. Strontium nitrate in 10 gram amounts is used and mixed with the other ingredients as above set forth. In place of strontium nitrate, strontium chloride or acetate may be employed. The strontium and barium salts thus produced are applied to the filament or surface as set forth in the above mentioned patent.

Any metallic salt which will dissolve in a colloidal solution can be used. Those metallic salts which are particularly applicable for use as thermionic coatings are the salts of the alkaline earth metals. The invention is not limited to the use of these particular metals however. In place of gelatin, other substances such as gum tragacanth, agar-agar, and starch may be used, and in fact any material that will act as a protective colloid.

When these coatings are applied to a heated filament core in the manner above referred to, the gelatin or colloid acts as an effective binder between the coating and the core until the metallic salts have become sufficiently heated to adhere readily of themselves to the core. The colloid, such as gelatin, being heated, carbonizes and in so doing has the effect of reducing on the core any oxides of the core metal which may have been formed thereon and which are generally objectionable to the proper action of the filament as a source of thermionic activity. The gelatin, volatilizing, passes off, leaving the metallic salts firmly deposited on the core.

What is claimed is:

1. A coating composition comprising colloidal particles of a salt of an alkaline earth metal in a colloidal solution.

2. A suspension comprising a salt of barium in a colloidal solution.

3. A suspension comprising barium carbonate and a colloid.

4. A suspension comprising barium carbonate and a solution of gelatin.

5. A coating composition comprising colloidal particles of an alkaline earth metal compound suspended in a colloidal solution.

6. A suspension comprising a carbonate of an alkaline earth metal and a colloidal solution.

7. A suspension comprising a carbonate of an alkaline earth metal and a solution of gelatin.

8. A coating comprising colloidal particles of a thermionic substance in colloidal suspension.

9. A thermionic coating comprising colloidal particles of a metallic salt in colloidal suspension.

10. A thermionic coating comprising colloidal particles of an alkaline earth metal salt in colloidal suspension.

11. A thermionic coating comprising barium carbonate in suspension in a colloidal solution.

12. A thermionic coating comprising the carbonate of an alkaline earth metal in suspension in a colloidal solution.

13. A thermionic coating comprising barium carbonate in suspension in a solution of gelatin.

14. A thermionic coating comprising the carbonate of an alkaline earth metal in suspension in a solution of gelatin.

15. The process of producing a thermionic coating which comprises forming a colloidal solution adding thereto a compound of an alkaline earth metal and adding thereafter another ingredient which converts said compound into colloidal particles of another compound of the metal in the presence of the colloid.

16. The process of producing a thermionic coating which comprises forming a colloidal solution, adding thereto a salt of an alkaline earth metal, and adding thereafter an ingredient which causes the suspension of another salt of the alkaline earth metal in the presence of the colloid.

17. The process of producing a thermionic coating which comprises forming a solution of gelatin, dissolving barium chloride therein and thereafter adding ammonium carbonate to form barium carbonate in the presence of the gelatin.

18. The process of producing a thermionic coating which comprises forming a solution of gelatin, adding the choride of an alkaline earth metal thereto, and thereafter adding ammonium carbonate to cause the suspension of a carbonate of said alkaline earth metal in the presence of the gelatin.

19. The process of coating a surface which comprises producing a colloidal suspension of a thermionic substance, applying said suspension to the surface and then heating the surface.

20. The process of coating a surface which comprises producing separate colloidal suspensions of a plurality of thermionic substances, successively applying the suspensions to the surface and heating the surface between successive applications.

21. The process of coating a surface which comprises forming a colloidal solution, adding thereto a salt of a metal, adding thereafter another ingredient which causes the suspension of another salt of the metal in the pressure of the colloid, applying this suspension to the surface and heating the surface.

22. The process of coating a surface which comprises forming a colloidal solution, adding thereto a salt of a metal, adding thereafter another ingredient which causes the suspension of another salt of the metal in the pressure of the colloid, applying this suspension to the surface in a plurality of applications and heating this surface between successive applications.

23. The process of coating a surface which comprises forming a colloidal solution, adding thereto a salt of an alkaline earth metal, adding thereafter an ingredient which causes the suspension of another salt of the alkaline earth metal in the presence of the colloid, applying this suspension to the surface and heating the surface.

In witness whereof, I hereunto subscribe my name this 12th day of December, A. D. 1919.

JAMES E. HARRIS.